Aug. 25, 1953     K. S. FERRIN     2,650,024
RECORD MEMBER

Filed Nov. 7, 1951     2 Sheets-Sheet 1

FIG. 1

JOHN DOE    ACC#       JOHN DOE    ACC#
16 A ST.     2468         16 A ST.     2468

IN ACCOUNT WITH
THE NATIONAL BANK & TRUST CO.

| CHECKS | | DEPOSITS | DATE | NO. OF CHECKS | BALANCE | C | I | F | D | DATE | NO. OF CHECKS | BALANCE |
|---|---|---|---|---|---|---|---|---|---|---|---|---|
| 444.44 | 555.55 | 3,333.33 | SEP 26-51 | 2 | 2,333.34 | | | | | SEP 26-51 | 2 | 2,333.34 |
| 444.44 | 555.55 | 666.66 | SEP 26-51 | 4 | 2,000.01 | | | | | SEP 26-51 | 4 | 2,000.01 |
| 888.88 | 777.77 | 999.99 | SEP 26-51 | 6 | 1,333.35 | | | | | SEP 26-51 | 6 | 1,333.35 |
| 2.22 | 3.33 | 4.44 | SEP 26-51 | 8 | 1,332.24 | | | | | SEP 26-51 | 8 | 1,332.24 |

JOHN DOE    ACC#
16 A ST.     2468

INVENTOR
KENNETH S. FERRIN

BY *Hearl Benst*
*Louis A. Kline*
HIS ATTORNEYS

Aug. 25, 1953  K. S. FERRIN  2,650,024
RECORD MEMBER

Filed Nov. 7, 1951  2 Sheets—Sheet 2

FIG. 4

| CHECKS | DEPOSITS | DATE | NO. OF CHECKS | BALANCE | C | I | F | D | DATE | NO. OF CHECKS | BALANCE |
|---|---|---|---|---|---|---|---|---|---|---|---|
| | | | | | | | | | | | |

JOHN DOE
16 A ST.
ACC# 2468

IN ACCOUNT WITH
THE NATIONAL BANK
& TRUST CO.

JOHN DOE
16 A ST.
ACC# 2468

FIG. 5

INVENTOR
KENNETH S. FERRIN
BY *Carl Benst*
*Louis A. Kline*
HIS ATTORNEYS

Patented Aug. 25, 1953

2,650,024

UNITED STATES PATENT OFFICE 2,650,024

RECORD MEMBER

Kenneth S. Ferrin, Dayton, Ohio, assignor to The National Cash Register Company, Dayton, Ohio, a corporation of Maryland Application November 7, 1951, Serial No. 255,155

6 Claims. (Cl. 235—61.12)

This invention relates to a novel record member and in particular to a record member for controlling a record-controlled machine by magnetic data recorded thereon and for receiving printed records from the machine.

In the past, record members having magnetizable data-retaining portions and portions for receiving printed data have been used as ledger sheets or statement sheets upon which are recorded a plurality of entries and related balances pertaining to an account, the magnetizable portion being capable of re-use to store the new balance in magnetic form at the end of various entry operations, which balance, as stored, is used to control the machine during a subsequent entry operation to automatically enter the previous new balance as an old balance; and the portion upon which printing is done containing a printed record of the entries and balances. At the end of an accounting period, the ledger or statement sheet is sent to the person to whom the account pertains, and, if the account is a running account, the balance, which is magnetically stored on the ledger or statement sheet that is to be sent, must be transferred to and stored magnetically on the new ledger or statement sheet that is to be used in the next accounting period. One form of such a record member is shown in the Bryce United States Patent No. 2,357,455.

Record members of the type shown in this patent, while having the advantage that balances are stored magnetically and can be picked up and entered automatically in a machine in a subsequent entry operation, have several disadvantages. First, the record member, which has the magnetizable material applied thereto, costs more to produce than a plain ledger sheet, due to the added operations of applying the magnetizable material, the adhesive coating, and the cover sheet, so that, when a large number of accounts is involved and a new ledger sheet is used for each account for each accounting period, this increased cost of the record members become important. Second, record members of this type, which store the new balance magnetically at the end of an entry operation and are used to enter the old balance in the next entry operation, have the further disadvantage that the balance stored magnetically on the member at the end of an accounting period, or when all the lines on the card are printed, must be read from the old ledger sheet and stored magnetically on the new ledger sheet before the new ledger sheet is put in operation.

Applicant's novel record member overcomes these disadvantages of the prior art record members and has many additional advantages which were not present in the prior art record members.

Basically, the novel record member consists of an envelope-like portion, upon which a machine can print a series of entries and balances pertaining to a particular account during an accounting period, and an insert sheet containing magnetizable material, which is inserted in the envelope-like portion prior to the making of the series of entries thereon and remain therein until the printing pertaining to the series of entries on the envelope-like portion has been completed, the magnetizable insert serving to temporarily store the new balance and any other desired data in magnetic form at the end of an entry operation and causing the entry of this balance to be made automatically in the machine as an old balance on the next entry operation. Accordingly, the envelope-like portion, with the magnetizable insert inserted therein, forms a unitary record member, upon which a plurality of related entries can be printed by a machine during an accounting period, and on which balances and other desired data can be recorded magnetically by the machine. This magnetic record enables the balance to be stored between entries and to be used to control the entry of the stored balance into a machine as an old balance in the next entry operation.

At the end of the accounting period, the magnetizable insert, with the last balance and other desired data magnetically recorded thereon, is removed from the envelope-like portion, which is then sent to the person to whom the account pertains, and the magnetizable insert is inserted into another envelope-like portion to form another record member related to the same account, upon which entries are to be made in the next accounting period. In this manner, the same magnetizable insert which is related to a particular account can be used over and over with a plurality of envelope-like portions over a number of accounting periods.

The envelope-like portion of the record member, which is the expendable portion, can be made of relatively cheap material, because all that is required of it is that it be capable of receiving legible prints. It need not be made of too heavy or expensive stock, because the inserted magnetizable sheet adds body to the member when it is inserted into the envelope-like portion and the member is being used.

The magnetizable insert, which is used over and over with a plurality of envelope-like portions to form a plurality of record members, can be a thin sheet of magnetic material, or a base sheet of non-magnetic material which has incorporated in it or is coated with magnetic material.

Since in the prior art it was the application of magnetic material to the expendable record members that made them costly to produce, it is seen that applicant's novel record member, in which the magnetic material is not applied to the expendable portion of the member but is retained for use with a plurality of expendable portions, will enable cheaper expendable portions to be used and will result in a reduction of the cost for the record members as compared to prior art record members for producing the same results, particularly when there are a large number of accounts and the use covers a large number of accounting periods.

Furthermore, in comparable record members in the prior art, the magnetic record of the balance was stored on the expendable record member, so that, at the end of an accounting period, the stored balance had to be transferred, from the record member which was to be sent out, to the record member which was to be used in the next accounting period. This transfer involved the reading of the magnetically stored balance from the record member which was to be sent out and the recording of the balance magnetically on the new record member. A similar transfer of the stored balance was required whenever the number of entries in an accounting period exceeded the capacity of the record member to receive printed entries. With the novel record member, this operation of transferring the balance and recording it magnetically on the new member is avoided, because the balance, which is stored on the magnetizable insert sheet, is carried over to the new member when the sheet is inserted into the envelope-like portion of the new member, and no readout and re-recording of the balance is necessary. Thus the novel record member eliminates the operations of readout and re-recording the balance when transferring the operations from an old record member to a new record member.

Other advantages of the novel record member will become apparent from the following description.

It is an object of the invention to provide an inexpensive record member having a print-receiving portion and a portion for storing data in the form of data-representing magnetization.

A further object of the invention is to provide a novel record member having an envelope-like portion and a readily removable magnetizable portion within the envelope-like portion for storing data in the form of data-representing magnetization.

A further object of the invention is to provide a record member having an inexpensive expendable printing-receiving envelope-like portion and having within the envelope-like portion a magnetizable insert for storing data in magnetic form, said magnetizable insert being capable of re-use by being insertable into other envelope-like portions to form other record members.

With these and incidental objects in view, the invention includes certain novel features of construction and combinations of parts, preferred forms or embodiments of which will be hereinafter described with reference to the drawings which accompany and form a part of this specification.

Of the drawings,

Fig. 1 shows a plan view of one form of the novel record member.

Fig. 2 is a section through the record member of Fig. 1, taken along the line 2—2 in that figure, with the sheets shown in enlarged thickness.

Fig. 3 shows a portion of a magnetizable insert sheet.

Fig. 4 shows a modified form of record member.

Fig. 5 is a section through the record member of Fig. 4, taken along the line 5—5 in that figure.

In order to describe the novel record member and to explain its advantages more fully, it will be described as embodied in a record member which is to be used by a bank in connection with a machine for producing the usual periodic statements of the condition of checking accounts. It is to be understood that this use is illustrative only and is not to be considered as the only use for the novel record member, as it is capable of use with machines for producing other statements or ledger sheets, particularly when it is desired to pick up an old balance from the record member and to replace it with a recording of a new balance.

Referring to Figs. 1, 2, and 3, it will be seen that the record member includes an expendable envelope-like portion which is provided with a front 20, a back 21, and side flaps 22 and 23, which are extensions of the back and are secured to the front to form an envelope which is open at the bottom.

The front 20 is pre-printed with suitable information, such as the name of the bank and columns with appropriate headings to identify the data to be printed in the columns by the machine during the accounting period.

The record member also includes a sheet 24 of magnetizable material, which, in the embodiment of Figs. 1, 2, and 3, is a sheet of paper stock having a coating of magnetizable material 25 on one side thereof. The coating 25 is shown as extending completely over the back side of the sheet, but it will be apparent that this is not necessary. All that is necessary is that the magnetizable material be applied to all positions where signals may be required. This sheet is inserted into the envelope-like portion and, together with the envelope-like portion, makes up the record member. Data can be recorded magnetically on the sheet in any location thereon as required by the reading and recording head location and other conditions in the machine with which the record member is to be used. An illustrative from of magnetic recording is shown in Fig. 1, where magnetic spots 26 have been recorded on the sheet to represent the last balance printed on the envelope-like portion.

The envelope-like portion and the sheet 24 can be provided with holes 27, which will be alined when the sheet is properly inserted in the envelope-like portion and which can then be used to insure that the record member is placed in the machine in proper relation thereto when the record member is being used.

In order to facilitate the entry of the sheet into the envelope-like portion, the corners of the sheet are rounded, and the back of the envelope-like portion is made longer than the front.

The sheet 24 is notched at 28 on its upper edge to enable the envelope-like portion to be gripped at this point without gripping the sheet, and the back of the envelope-like portion is notched at 29 on its lower edge to enable the sheet to be gripped at this point, so that the sheet can be more readily removed from the envelope-like portion.

One manner in which this record member will be used is as follows:

The sheet 24 will have printed thereon identifying data, such as an account number, the name of the person to whom the account pertains, and any other desired information. This sheet will be related to this account and will be usable during a plurality of accounting periods.

The envelope-like portion, which is to be used with the sheet to form the record member for the accounting period, will also have printed thereon identifying data, such as the account number, the name of the person to whom the account pertains, and any other information.

The account numbers on the sheet 24 and the envelope-like portion which make up the record member can be compared visually when the sheet is being inserted in the envelope-like portion, to insure correct correspondence of the two.

If there have been no previous entries in the account, there will be no balance stored magnetically on the sheet, so, upon the first entry operation, the value of checks and/or deposits will be entered in the machine from other sources of information, as by punched cards or manual depression of keys, and these amounts will be accumulated to form the new balance. The various entered amounts and other data will be printed on the envelope-like portion. The machine can then operate to print the new balance and store this new balance in magnetic form on the sheet. At the end of this entry operation, the various data will have been printed on the envelope-like portion, and the new balance will have been magnetically stored on the sheet.

In the next entry operation, the balance which was stored magnetically on the sheet will be read therefrom and entered into the machine as the old balance and will be cleared from the sheet. The entries of further amounts of checks and/or deposits will be made and added to or subtracted from the old balance that was picked up, to form a new balance. The new balance thus formed will be printed on the envelope-like portion and recorded magnetically on the sheet.

Thus, at the end of each entry operation, a printed record of the amounts involved in the entry and other related data, together with the new balance, will be available on the expendable envelope-like portion, and a magnetic record of the new balance will be stored on the sheet.

When all the available printing lines on the envelope-like portion have been used, or at the end of the accounting period, the sheet containing the stored balance is removed from the used envelope-like portion and inserted in another envelope-like portion, which has been identified with the account, to form another record member. It is to be noted that the transfer of the sheet from one envelope-like portion to another automatically associates the stored balance with the new envelope-like portion, so that further entries can be made without any readout and magnetic re-recording of the balance. If desired, the machine can be operated in a "Balance Forward" operation, or the like, to print the balance at the top of the new envelope-like portion without erasing the stored amount.

At the end of the accounting period, the cancelled checks, and any other material to be sent to the person to whom the account pertains, can be inserted in the envelope-like portion, which can be folded to obscure the front face and be used as a mailing envelope.

It is thus seen that the more costly portion of the record member, the magnetizable sheet, can be used over and over with the less costly expendable envelope-like portions and will provide an economical type of record member. It is also seen that the balance is transferred from record member to record member when the magnetizable sheet is transferred from one envelope-like portion to another.

The recording of data on the magnetizable sheet is not limited to balances, since other data, such as the account number and the line designation on which the next printing is to take place, can also be recorded thereon. If the account number is recorded on the sheet, then arrangements can be made in the machine to read this number and compare it with an account number which is set up as a part of the entry operation, thereby to insure that the magnetizable sheet for the proper account is being used. Also, if the line designation is provided on the sheet, the designation remaining at the end of an accounting period could be erased and a new signal recorded during the "Balance Forward" operation noted above, so that printing would begin on the first entry line of the new envelope-like portion.

Another embodiment of the novel record member, using a different form of envelope-like portion with an inserted magnetizable sheet to form a record member, is shown in Figs. 4 and 5. In this embodiment, the envelope-like portion has a front sheet 30, which has pre-printed thereon suitable information, columns and headings as explained for the front 20 of the record member of Fig. 1, and is formed on the back with two oppositely-disposed pockets 31 and 32, which extend along the sides of the envelope-like portion and open toward the center, as particularly shown in Fig. 5.

A magnetizable sheet 33 can be inserted into the envelope-like portion to form the record member, the sheet being inserted by placing the side edges in the pockets 31 and 32. As in the case with the embodiment of Figs. 1 to 3, the sheet may be a sheet of magnetizable material or may be a sheet of non-magnetic material having coated thereon or incorporated therein magnetizable material.

As in the case of the record member of Figs. 1 to 3, the record member of Figs. 4 and 5 may be provided with locating holes 34 and have an account number and the name of the person to whom the account pertains printed on the envelope-like portion as well as on the sheet.

The form of envelope-like portion shown in Figs. 4 and 5 has an advantage over the form shown in Figs. 1 to 3 in that the central portion of the inserted magnetizable sheet is not covered by the envelope, and the pick-up and recording heads can directly contact the inserted sheet if desired.

However, if it is desired to expose the magnetic coating 25 of the inserted sheet 24 in the embodiment of Figs. 1 to 3 for direct contact with the reading or recording heads, then a suitable window can be provided in the back 21 to make available the area on the sheet upon which magnetic recording and pick-up is to take place.

The record member of the embodiment shown in Figs. 4 and 5 would be used to control a machine and receive printed records therefrom in the same manner as explained above in connection with the embodiment shown in Figs. 1 to 3.

While the forms of the invention shown and described herein are admirably adapted to fulfill the objects primarily stated, it is to be understood that it is not intended to confine the invention to the forms or embodimens disclosed herein, for it is susceptible of embodiment in various other forms.

What is claimed is:

1. A record member upon which data can be printed by a machine and upon which data can be stored magnetically in one operation of the machine for use in controlling a further operation of the machine, said record member consisting of an expendable envelope-like portion upon which the printed record of the data can be made; and an inexpendable portion of magnetizable material inserted in said envelope-like portion and upon which related magnetic records of data may be made by the machine to store data to be used in controlling a subsequent operation of the machine.

2. A record member for controlling a record-controlled machine, said member consisting of an expendable envelope-like portion upon which data can be printed by the machine, and a magnetizable portion inserted in the envelope-like portion, said magnetizable portion being selectively magnetized by the machine in one operation thereof to store data for use in controlling a subsequent operation of the machine, and said magnetizable portion being usable with a plurality of envelope-like portions to form a plurality of record members and, by its transfer from one envelope-like portion to another, also transferring the last stored data from the old record member to the new.

3. A ledger sheet control member upon which entries and balances related to an account can be printed by a machine and upon which said balances can be stored magnetically by the machine in one operation thereof to be used to control the machine to pick up the balance as an old balance in a subsequent operation, said member consisting of an expendable envelope-like portion having a plurality of line space positions in which entries and related balances can be printed in a plurality of entry operations, and further consisting of a removable sheet inserted in the envelope-like portion and containing magnetizable material upon which said balances are erasably recorded successively by selective magnetization to store the new balance at the end of each entry operation, which new balance is stored temporarily and is used to control the machine to provide an old balance pick-up in the next entry operation, said sheet being usable with a plurality of envelope-like portions in succession to form a plurality of control members and, when transferred from the envelope-like portion of one control member to another envelope-like portion to form a new control member, also carrying to the new control member the last balance that was printed on the envelope-like portion of the old control member.

4. A ledger sheet control member as claimed in claim 3 in which an identifying account number is recorded on the envelope-like portions and on the insertable sheet so that an envelope-like portion and sheet related to the same account will be used to form the control member for that account.

5. The record member of claim 1 in which the envelope-like portion and the inexpendable portion are provided with locating means which register when the inexpendable portion is properly inserted in the envelope-like portion.

6. The record member of claim 3 in which similar identifying marks are provided on the envelope-like portions and on the magnetizable portion to assist in the proper coordination of the magnetizable portion with the various envelope-like portions.

KENNETH S. FERRIN.

References Cited in the file of this patent

UNITED STATES PATENTS

| Number | Name | Date |
| --- | --- | --- |
| 2,537,732 | Angus | Jan. 9, 1951 |
| 2,363,096 | Sullivan | Nov. 21, 1944 |